(12) United States Patent
Yamakawa et al.

(10) Patent No.: US 10,363,831 B2
(45) Date of Patent: Jul. 30, 2019

(54) ELECTRICAL POWER SYSTEM

(71) Applicant: TOYOTA JIDOSHA KABUSHIKI KAISHA, Toyota-shi, Aichi-ken (JP)

(72) Inventors: Toshifumi Yamakawa, Okazaki (JP); Masaki Okamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 436 days.

(21) Appl. No.: 15/385,382

(22) Filed: Dec. 20, 2016

(65) Prior Publication Data
US 2017/0182911 A1   Jun. 29, 2017

(30) Foreign Application Priority Data
Dec. 24, 2015  (JP) .................... 2015-251034

(51) Int. Cl.
*B60L 1/00*    (2006.01)
*B60L 3/00*    (2019.01)
*H02G 3/00*    (2006.01)
*B60L 15/00*   (2006.01)
*H02M 7/44*    (2006.01)
(Continued)

(52) U.S. Cl.
CPC ............ *B60L 15/007* (2013.01); *B60L 3/003* (2013.01); *B60L 3/0007* (2013.01); *B60L 15/20* (2013.01); *B60L 50/51* (2019.02); *H02M 7/44* (2013.01); *B60L 2210/10* (2013.01); *B60L 2210/42* (2013.01); *B60L 2240/465* (2013.01); *B60L 2240/529* (2013.01); *B60L 2240/80* (2013.01); *B60Y 2200/92* (2013.01); *B60Y 2400/112* (2013.01); *B60Y 2400/114* (2013.01); *Y02T 10/645* (2013.01); *Y02T 10/7005* (2013.01);
(Continued)

(58) Field of Classification Search
CPC ...... B60L 15/007; B60L 15/20; B60L 3/0007; B60L 3/003; B60L 50/51; B60L 2210/10; B60L 2210/42; B60L 2240/465; B60L 2240/529; B60L 2240/80; H02M 7/44; B60Y 2200/92; B60Y 2400/112; B60Y 2400/114; Y02T 10/645; Y02T 10/7005; Y02T 10/7216; Y02T 10/7275
USPC .......................................... 307/10.1
See application file for complete search history.

(56) References Cited

U.S. PATENT DOCUMENTS

| 2010/0094497 | A1* | 4/2010 | Oyobe | H02J 7/1446 701/22 |
| 2011/0040436 | A1* | 2/2011 | Yamamoto | B60W 20/13 701/22 |
| 2017/0129350 | A1* | 5/2017 | Mitsutani | B60L 58/10 |

FOREIGN PATENT DOCUMENTS

JP   2010-098823 A   4/2010

* cited by examiner

*Primary Examiner* — Rexford N Barnie
*Assistant Examiner* — Toan T Vu
(74) *Attorney, Agent, or Firm* — Hunton Andrews Kurth LLP

(57) ABSTRACT

A power system has a first converter; a second converter; a first controller for generating a first command and a second command, controlling the first converter on the basis of the first command, and transmitting the second command to a second controller; and the second controller for controlling the second converter on the basis of the second command. The first controller adjusts the first command to cancel at least one of shortage and excess of second current by first current. The second controller controls the second converter on the basis of the second command when the first command is smaller than first upper limit. The second controller
(Continued)

controls the second converter on the basis of second upper limit when the first command reaches the first upper limit.

5 Claims, 9 Drawing Sheets

(51) Int. Cl.
*B60L 15/20* (2006.01)
*B60L 50/51* (2019.01)
(52) U.S. Cl.
CPC ........ *Y02T 10/7216* (2013.01); *Y02T 10/7275* (2013.01)

ELECTRICAL POWER SYSTEM

CROSS-REFERENCE TO RELATED APPLICATION

The present application claims priority to Japanese Patent Application No. 2015-251034 filed on Dec. 24, 2015, which is incorporated herein by reference in its entirety.

TECHNICAL FIELD

The present invention relates to a technical field of an electrical power system that is provided with: a plurality of electrical power converters; and a plurality of control apparatuses that controls the plurality of electrical power converters, respectively, for example.

BACKGROUND ART

Japanese Unexamined Patent Application Publication No. 2010-098823 discloses an electrical vehicle that is provided with: an electrical power storage apparatus; a motor generator; a converter; and a control apparatus. The control apparatus has a MG-ECU (Motor Generator Electrical Control Unit) and HV-ECU (Hybrid Vehicle Electrical Control Unit) whose functions are different from each other, because of a processing capacity. The HV-ECU generates an operating command for the motor generator and the electrical power storage apparatus. The HV-ECU is connected to the MG-ECU via a communication line. The HV-ECU transmits the generated operating command to the MG-ECU via the communication line. The MG-ECU receives the operating command that is transmitted from the HV-ECU. The MG-ECU controls the motor generator and the converter on the basis of the received operating command.

SUMMARY

Technical Problem

The electrical vehicle disclosed in the Japanese Unexamined Patent Application Publication No. 2010-098823 is provided with a plurality of converters. The plurality of converters is controlled by a single control apparatus (the MG-ECU). However, when the plurality of converters are controlled by the single control apparatus, there is a possibility that the processing capacity of the single control apparatus is smaller than a capacity that is required for controlling the plurality of converters. Thus, in order to solve the technical problem of the processing capacity, a plurality of ECUs (namely, the control apparatuses) may be used to control the plurality of converters, respectively.

Specifically, when the electrical vehicle is provided with: a first converter and a second converter, a first control apparatus that controls the first converter and a second control apparatus that controls the second converter may be used. In this case, the first control apparatus generates an operating command for the first converter (a first operating command) and an operating command for the second converter (a second operating command). The first control apparatus controls the first converter on the basis of the generated first operating command such that a first electrical current based on the generated first operating command flows through the first converter. Moreover, the first control apparatus transmits the generated second operating command to the second control apparatus. The second control apparatus receives the second operating command. The second control apparatus controls the second converter on the basis of the received second operating command such that a second electrical current based on the received second operating command flows through the first converter.

However, since the second operating command is transmitted from the first control apparatus to the second control apparatus, there is a possibility that there is a difference between a timing at which the second control apparatus controls the second converter on the basis of the second operating command and a timing at which the first control apparatus controls the first converter on the basis of the first operating command. This difference of the timing may occur when a cycle at which the first control apparatus transmits the second operating command is longer than a cycle at which the first control apparatus generates the second operating command. When the cycle at which the first control apparatus transmits the second operating command is longer than the cycle at which the first control apparatus generates the second operating command, the second operating command that is received by the second control apparatus does not constantly correspond to the second operating command that is generated by the first control apparatus. Thus, the second control apparatus performs a predetermined signal processing on the received second operating command to restore the second operating command that would be generated by the first control apparatus from the received second operating command. However, there is a possibility that the restored second operating command becomes a signal that has a time lag with respect to the second operating command that is generated by the first control apparatus. In this case, the second control apparatus controls the second converter at a certain timing on the basis of the second operating command that is different from the second operating command to be used at the same timing. As a result, there is a possibility that the second electrical current that is actually inputted to or outputted from the second converter at a certain timing is smaller than or larger than a required electrical current that should be inputted to or outputted from the second converter at the same timing.

Therefore, the first control apparatus may adjust the first operating command to cancel (in other words, compensate) at least one of shortage and excess of the second electrical current by adjusting the first electrical current. Specifically, the first control apparatus increases the first operating command in accordance with an amount of the shortage of the second electrical current when the shortage of the second electrical current occurs. As a result, the first electrical current increases and thus the shortage of the second electrical current is canceled by the increase of the first electrical current. On the other hand, the first control apparatus decreases the first operating command in accordance with an amount of the excess of the second electrical current when the excess of the second electrical current occurs. As a result, the first electrical current decreases and thus the excess of the second electrical current is canceled by the decrease of the first electrical current.

On the other hand, the adjustment of the first operating command may be limited in some cases. Specifically, an upper limit of the first electrical current is usually set on the basis of a specification of the first converter and a specification of the electrical vehicle. Thus, an upper limit of the first operating command for specifying the first electrical current is also set. Thus, when the first operating command reaches the upper limit, the first control apparatus is not capable of increasing the first operating command any more.

However, even when the first operating command reaches the upper limit, there is a possibility that the shortage of the second electrical current occurs. In this case, the first control apparatus is not capable of canceling the shortage of the second electrical current by increasing the first operating command (namely, increasing the first electrical current). Thus, there is a possibility that the shortage of the second electrical current occurs over relatively longer period in the case where the first operating command reaches the upper limit, compared to the case where the first operating command is smaller than the upper limit, which is a technical problem.

The above described technical problem is one example of the technical problem to be solved by embodiments of the present invention. It is therefore an object of embodiments of the present invention to provide, for example, an electrical power system that is provided with: a plurality of electrical power converters; and a plurality of control apparatuses that controls the plurality of electrical power converters, respectively, and that is capable of suppressing an increase of a period over which a shortage of an electrical current flowing through another electrical power converter occurs even when an operating command for specifying an electrical current flowing through one electrical power converter reaches an upper limit of the operating command.

Solution to Problem

One aspect of an electrical power system is an electrical power system that is provided with: a first electrical power converter that is configured to perform a first electrical power conversion between an electrical power storage apparatus and a load; a second electrical power converter that is configured to perform a second electrical power conversion between the electrical power storage apparatus and the load; a first control apparatus that is configured to periodically generate a first command signal and a second command signal at a first cycle, to control the first electrical power converter such that a first electrical current based on the first command signal flows through by the first electrical power conversion, and to periodically transmit the second command signal to a second control apparatus via a communication line at a second cycle that is longer than the first cycle. The second control apparatus is configured to receive the second command signal transmitted by the first control apparatus, to perform a predetermined signal processing on the received second command signal, and to control the second electrical power converter such that a second electrical current based on the second command signal on which the signal processing is performed flows through by the second electrical power conversion. The first control apparatus is configured to adjust the generated first command signal to allow at least one of shortage and excess of the second electrical current that actually flows by the second electrical power conversion to be canceled by the first electrical current. After generating the first command signal and the second command signal, at least one of the first control apparatus and the second control apparatus is configured to determine whether or not the generated first command signal reaches a first upper limit value that specifies an upper limit of the first command signal. The second control apparatus is configured to control the second electrical power converter such that the second electrical current based on the second command signal on which the signal processing is performed flows through, when it is determined that the generated first command signal is smaller than the first upper limit value, the second control apparatus is configured to control the second electrical power converter such that the second electrical current based on a second upper limit value that specifies an upper limit of the second command signal flows through, when it is determined that the generated first command signal reaches the first upper limit value.

According to one aspect of the electrical power system, when the first command signal reaches the first upper limit value, not the second electrical current based on the second command signal but the second electrical current based on the second upper limit value flows. Thus, it is possible to suppress an increase of a period over which a shortage of the second electrical current occurs, compared to the case where the second electrical current based on the second command signal flows even when the first command signal reaches the first upper limit value.

In another aspect of the above described aspect of the electrical power system, the second control apparatus is configured to control the second electrical power converter such that the second electrical current based on the second upper limit value flows through, when it is determined that the generated first command signal reaches the first upper limit value, even when the second command signal on which the signal processing is performed is smaller than the second upper limit value.

According to this aspect, the second electrical current that is larger than the second electrical current based on the second command signal flows (namely, the second electrical current based on the second upper limit value flows). Thus, it is possible to suppress the increase of the period over which the shortage of the second electrical current occurs, compared to the case where the second electrical current based on the second command signal flows even when the first command signal reaches the first upper limit value.

In another aspect of the above described one aspect of the electrical power system, the first control apparatus is configured to adjust the first command signal by simulating the second command signal that is used at a first timing by the second control apparatus to control the second electrical power converter and then adding the first command signal that is generated at the first timing and an adjustment signal that corresponds to a difference between the simulated second command signal and the second command signal that is generated at the first timing.

According to this aspect, the first control apparatus is capable of appropriately adjusting the first command signal to allow the at least one of the shortage and the excess of the second electrical current to be canceled by the first electrical current by simulating the second command signal that is actually used by the second control apparatus.

In another aspect of the above described electrical power system that is configured to simulate the second command signal, the first control apparatus includes a buffer that is configured to buffering the generated second command signal, the first control apparatus is configured to simulate the second command signal by periodically extracting the latest second command signal from the buffer at the second cycle and then performing the predetermined signal processing on the extracted second command signal.

According to this aspect, the first control apparatus is capable of appropriately simulating the second command signal that is actually used by the second control apparatus.

In another aspect of the above descried aspect of the electrical power system, the electrical power system is mounted on a vehicle, and the load includes a rotating electrical machine that is a driving power source for the vehicle As described above, an increase of a required electrical current (namely, an electrical current that should be inputted to the load or that should be outputted from the load) may allow the first command signal to reach the first upper limit value. On the other hand, there is a possibility that the vehicle slips depending on a driving condition. When the vehicle slips, a rotation number of the rotating electrical machine temporarily increases and thus the required electrical current likely increases excessively. Therefore, there is a possibility that the situation where the first command signal reaches the first upper limit value occurs relatively easily in the vehicle. Thus, when the electrical power system is mounted on the vehicle, it is possible to suppress the increase of the period over which the shortage of the second electrical current occurs even in the vehicle in which the situation where the first command signal reaches the first upper limit value occurs relatively easily. Thus, the electrical power system is capable of allowing a stable driving of the vehicle.

The operation and other advantages in the present invention will become more apparent from the embodiments explained below. objects and advantages of the present invention will be realized and attained by means of the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

Hereinafter, an electrical source control apparatus of the second embodiment will be explained. Incidentally, in the following explanation, a vehicle 1 to which one example of the electrical power system is adapted will be explained. However, the electrical power system may be adapted to any apparatus that is different from the vehicle.

(1) Structure of Vehicle 1

Figure 1:
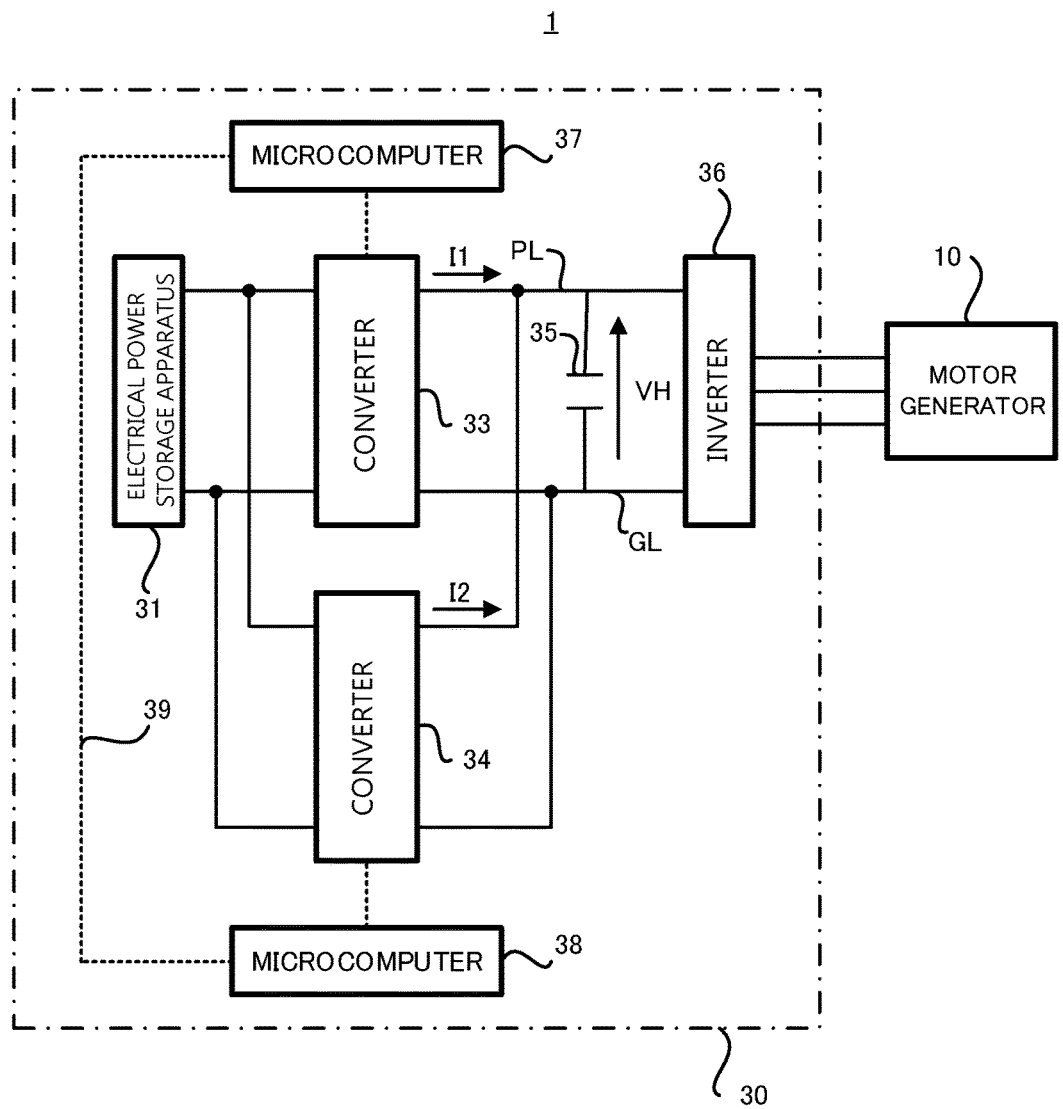
FIG. 1 is a block diagram that illustrates one example of an entire structure of a vehicle of the present embodiment.
Figure 2:
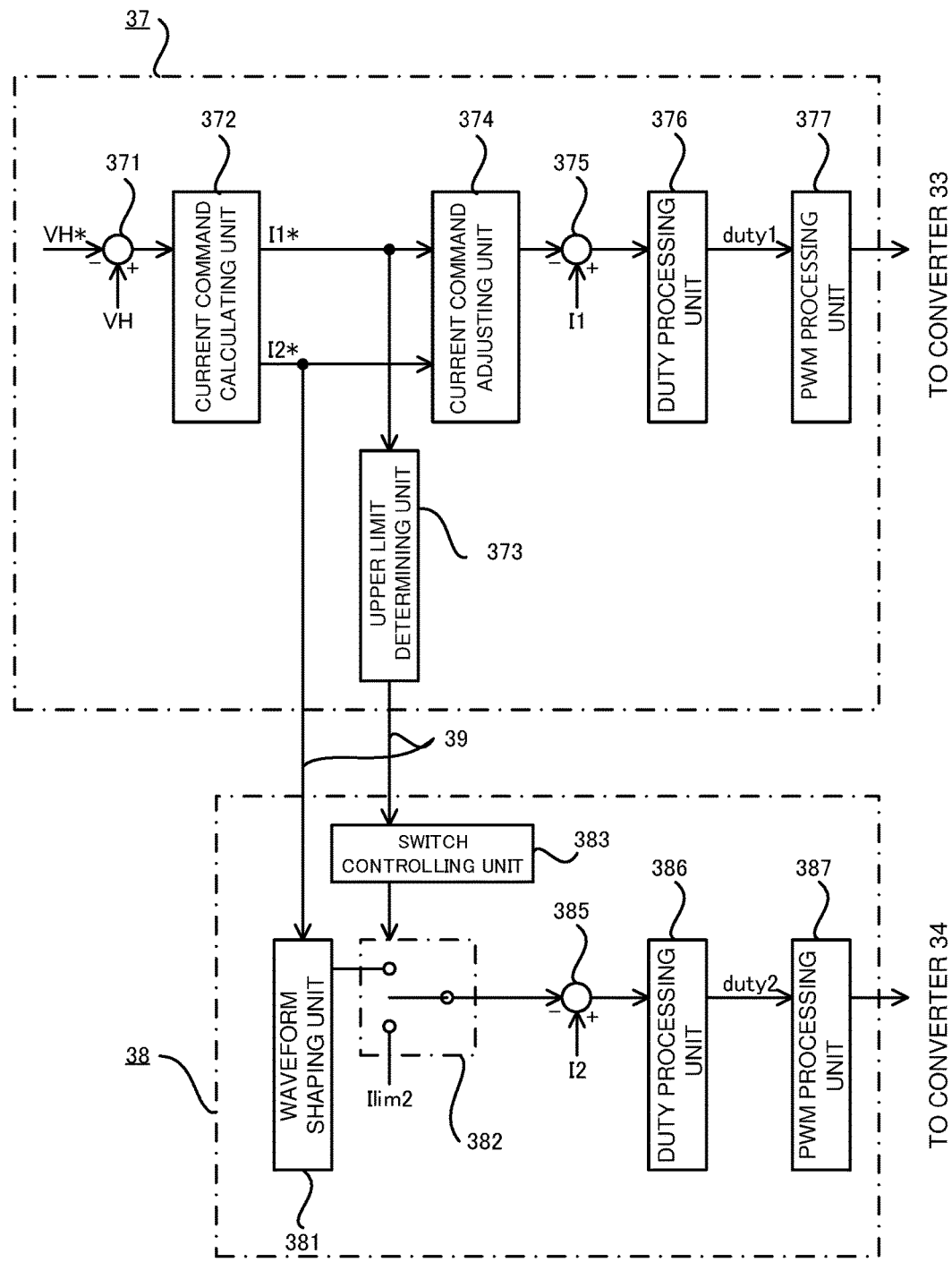
FIG. 2 is a block diagram that illustrates one example of a structure of a microcomputer.
Figure 3:
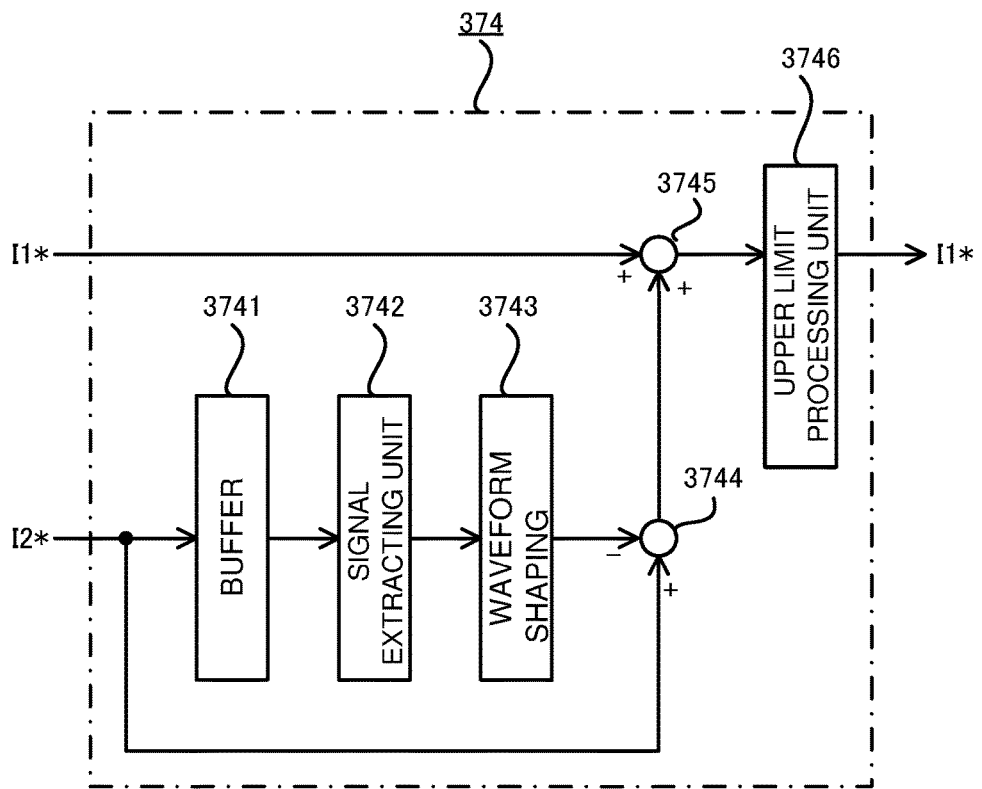
FIG. 3 is a block diagram that illustrates one example of a structure of a current command adjusting unit.

With reference to FIG. 1 to FIG. 3, the structure of the vehicle 1 of the present embodiment will be explained.

(1-1) Entire Structure of Vehicle 1

Firstly, with reference to FIG. 1, the entire structure of the vehicle 1 of the present embodiment will be explained. As illustrated in FIG. 1, the vehicle 1 is provided with: a motor generator 10 that is one example of the "load" and the electrical power system 30.

The motor generator 10 is configured to operate by using an electrical power that is outputted from the electrical power system 30, when the vehicle 1 is in a power running state. Thus, the motor generator 10 is configured to mainly function as a motor for supplying a driving power that may be used by the vehicle 1 to move. Moreover, the motor generator 10 is configured to mainly function as a generator for charging an electrical power storage apparatus 31 of the electrical power system 30, when the vehicle 1 is in a regeneration state.

FIG. 1 illustrates, as one example of the vehicle, the vehicle 1 that is provided with one motor generator 10. However, the vehicle 1 may be provided with two or more motor generators 10. Furthermore, the vehicle 1 may be provided with an engine in addition to the motor generator 10.

The electrical power system 30 is configured to output to the motor generator 10 the electrical power that may be used by the motor generator 10 to function as the motor, when the vehicle 1 is in the power running state. Furthermore, the electrical power that is generated by the motor generator 10 functioning as the generator is inputted from the motor generator 10 to the electrical power system 30, when the vehicle 1 is in the regeneration state.

The electrical power system 30 is provided with: the electrical power storage apparatus 31, a converter 33 that is one example of the "first electrical power converter", a converter 34 that is one example of the "second electrical power converter", a smoothing condenser 35, an inverter 36, a microcomputer 37 that is one example of the "first control apparatus" and a microcomputer 38 that is one example of the "second control apparatus".

The electrical power storage apparatus 31 is an apparatus that is configured to output the electrical power (namely, discharging). The electrical power storage apparatus 31 is an apparatus to which the electrical power can be inputted (namely, that can be charged). The electrical power storage apparatus 31 may include a battery that includes at least one of a lead battery, a lithium-ion battery, a nickel-hydrogen battery, a fuel battery and the like. The electrical power storage apparatus 31 may include a capacitor that includes at least one of a lithium-ion capacitor, an electrical double layer capacitor and the like.

The converter 33 is configured to perform an electrical power conversion between the electrical power storage apparatus 31 and the motor generator 10 (alternatively, the inverter 36) under the control of the microcomputer 37. Specifically, the converter 33 is configured to perform the electrical power conversion to allow a converter current I1 that is an electrical current flowing through the converter 33 to be same as an electrical command signal I1*.

The converter 34 is configured to perform an electrical power conversion between the electrical power storage apparatus 31 and the motor generator 10 (alternatively, the inverter 36) under the control of the microcomputer 38. Specifically, the converter 34 is configured to perform the electrical power conversion to allow a converter current I2 that is an electrical current flowing through the converter 34 to be same as an electrical command signal I2*.

These electrical power conversions substantially allow the converter 33 and the converter 34 to control a distribution of the electrical power between the electrical power storage apparatus 31 and the motor generator 10 (alternatively, the inverter 36).

The smoothing condenser 35 is configured to smooth a variation of an electrical voltage between a power source line PL and a ground line GL that connect the converters 33 and 34 and the inverter 36. In the following explanation, the electrical voltage between the power source line PL and the ground line GL is referred to as an "electrical voltage VH"

The inverter 36 is configured to convert the electrical power (DC (Direct Current) electrical power) that is outputted from at least one of the converter 33 and the converter 34 to an AC (Alternating Current) electrical power, when the vehicle 1 is in the power-running state. The inverter 36 is configured to convert the electrical power (AC electrical power) that is generated by the motor generator 10 to the DC electrical power, when the vehicle 1 is in the regeneration state.

The microcomputer 37 is configured to control the electrical power conversion that is performed by the converter 33. The microcomputer 38 is configured to control the electrical power conversion that is performed by the converter 34. Each of the microcomputer 37 and the microcomputer 38 may include a CPU (Central Processing Unit), a ROM (Read Only Memory), a RAM (Random Access Memory) and the like. The microcomputer 37 and the microcomputer 38 are configured to communicate with each other via a wire or wireless communication line 39.

(1-2) Structures of Microcomputers 37 and 38

Next, with reference to FIG. 2, the structure of each of the microcomputer 37 and the microcomputer 38 will be explained.

As illustrated in FIG. 2, the microcomputer 37 includes, as circuit blocks that are physically realized in the microcomputer 37 or processing blocks that are logically realized in the microcomputer 37, a subtracter 371, an current command calculating unit 372, an upper limit determining unit 373, an current command adjusting unit 374, a subtracter 375, a duty processing unit 376 and a PWM (Pulse Width Modulation) processing unit 377.

The subtracter 371 is configured to subtract a voltage command value VH* that specifies a target value of the electrical voltage VH from the electrical voltage VH that is actually detected. The electrical voltage VH may be detected by a non-illustrated electrical voltage sensor that is located between the power source line PL and the ground line GL, for example. The voltage command value VH* may be calculated by a non-illustrated voltage command calculating unit on the basis of a torque that is required for the motor generator 10 (i.e. a required torque) and a rotation number of the motor generator 10 (i.e. a motor rotation number), for example.

The current command calculating unit 372 is configured to periodically calculate (namely, generate) a current command signal I1* and a current command signal I2* at a first cycle on the basis of a subtraction result ΔVH (=VH−VH*) of the subtracter 371. The current command signal I1* represents a target value of the converter current I1. The current command signal I2* represents a target value of the converter current I2. The current command calculating unit 372 is configured to output the calculated current command signal I1* and the calculated current command signal I2* to the current command adjusting unit 374. Moreover, the current command calculating unit 372 is configured to periodically transmit the calculated current command signal I2* to the microcomputer 38 via the communication line 39 at a second cycle that is longer than the first cycle.

With respect to the current command signal I1*, an upper limit value Ilim1 that specifies an upper limit of the current command signal I1* is set. The current command calculating unit 372 is configured to perform an upper limit processing based on the upper limit value Ilim1 in calculating the current command signal I1*. The upper limit processing does not allow the current command signal I1* that is obtained by the calculation of the current command calculating unit 372 to be more than the upper limit value Ilim1. The upper limit value Ilim1 may be set in advance on the basis of an upper limit of the converter current I1. The upper limit of the converter current I1 may be set in advance on the basis of a specification of the converter 33 and the like. The upper limit value Ilim1 is one specific example of the "first upper limit value".

Similarly, with respect to the current command signal I2*, an upper limit value Ilim2 that specifies an upper limit of the current command signal I2* is set. The current command calculating unit 372 is configured to perform an upper limit processing based on the upper limit value Ilim2 in calculating the current command signal I2*. The upper limit processing does not allow the current command signal I2* that is obtained by the calculation of the current command calculating unit 372 to be more than the upper limit value Ilim2. The upper limit value Ilim2 may be set in advance on the basis of an upper limit of the converter current I2. The upper limit of the converter current I2 may be set in advance on the basis of a specification of the converter 34 and the like. The upper limit value Ilim2 is one specific example of the "second upper limit value".

The upper limit determining unit 373 is configured to determine whether or not the current command signal I1* that is obtained by the calculation of the current command calculating unit 372 reaches the upper limit value Ilim1. The upper limit determining unit 373 is configured to periodically transmit a determination result to the microcomputer 38 via the communication line 39 at the second cycle (alternatively, a third cycle that is different from the second cycle).

The current command adjusting unit 374 is configured to adjust the current command signal I1* on the basis of the current command signal I2*. Specifically, the current command adjusting unit 374 is configured to adjust the current command signal I1* to allow a shortage of the actual converter current I2 with respect to a required electrical current I2r to be canceled (in other words, compensated) by the converter current I1 (specifically, by an increase of the converter current I1). The required electrical current I2r corresponds to the converter current I2 that should be inputted to the converter 34 or that should be outputted from the converter 34. Alternatively, the current command adjusting unit 374 is configured to adjust the current command signal I1* to allow an excess of the actual converter current I2 with respect to the required electrical current I2r to be canceled (in other words, compensated) by the converter current I1 (specifically, by a decrease of the converter current I1). The current command adjusting unit 374 is configured to output the adjusted current command signal I1* to the subtracter 375. Incidentally, the current command adjusting unit 374 is configure to adjust the current command signal I1* within a range that is equal to or smaller than the upper limit value Ilim1. Namely, the current command adjusting unit 374 is configured to perform an upper limit processing based on the upper limit value Ilim1 in adjusting the current command signal I1*. The upper limit processing does not allow the current command signal I1* that is obtained by the adjustment of the current command adjusting unit 374 to be more than the upper limit value Ilim1.

The subtracter 375 is configured to subtract the current command signal I1* that is outputted from the current command adjusting unit 374 from the converter current I1 that is actually detected. The converter current I1 may be detected by a non-illustrated electrical current sensor that is electrically connected to the converter 33 in parallel, for example.

The duty processing unit 376 is configured to calculate a duty ratio duty1 that is used for controlling the converter 33 in a PWM control method on the basis of a subtraction result ΔI1 (=I1−I1*) of the subtracter 375. The duty processing unit 376 is configured to calculate the duty ratio duty1 to allow the subtraction result ΔI1 to be same as zero. Thus, the duty processing unit 376 is configured to calculate the duty ratio duty1 by performing a feedback control (for example, a PI (Proportional Integral) control or a PID (Proportional Integral Differential) control) based on the converter current I1.

The PWM processing unit 377 is configured to generate a PWM signal Vm1 that is used for controlling the operation of the converter 33 on the basis of the duty ratio duty1 and a predetermined carrier signal. As a result, a switching state(s) of a switching element(s) of the converter 33 changes depending on the PWM signal Vm1. As a result, the converter 33 performs the electrical power conversion to allow the converter current I1 to be same as the current command signal I1* that is inputted to the subtracter 375.

The microcomputer 38 includes, as circuit blocks that are physically realized in the microcomputer 38 or processing blocks that are logically realized in the microcomputer 38, a waveform shaping unit 381, a switch 382, a switch controlling unit 383, a subtracter 385, a duty processing unit 386 and a PWM processing unit 387.

The waveform shaping unit 381 is configured to receive the current command signal I2* that is transmitted from the microcomputer 37 via the communication line 39. The waveform shaping unit 381 is configured to perform a predetermined waveform-shape processing on the received current command signal I2*.

The switch 382 is configured to selectively output, to the subtracter 385, either one of the current command signal I2* that is obtained by the waveform-shape processing of the waveform shaping unit 381 and the upper limit value Ilim2.

The switch controlling unit 383 is configured to receive the determination result of the upper limit determining unit 373 that is transmitted from the microcomputer 37 via the communication line 39. The switch controlling unit 383 is configured to control the switch 382 to output either one of the current command signal I2* and the upper limit value Ilim2 on the basis of the determination result of the upper limit determining unit 373. Specifically, the switch controlling unit 383 is configured to control the switch 382 to output the current command signal I2* when the determination result of the upper limit determining unit 373 represents that the current command signal I1* does not reach the upper limit value Ilim1 (namely, the current command signal I1* is smaller than the upper limit value Ilim1). The switch controlling unit 383 is configured to control the switch 382 to output the upper limit value Ilim2 when the determination result of the upper limit determining unit 373 represents that the current command signal I1* reaches the upper limit value Ilim1.

The subtracter 385 is configured to subtract the current command signal I2* or the upper limit value Ilim2 that is outputted from the switch 382 from the converter current I2 that is actually detected. The converter current I2 may be detected by a non-illustrated electrical current sensor that is electrically connected to the converter 34 in parallel, for example.

The duty processing unit 386 is configured to calculate a duty ratio duty2 that is used for controlling the converter 34 in the PWM control method on the basis of a subtraction result ΔI2 (=I2−I2* or I2−Ilim2) of the subtracter 385. The duty processing unit 386 is configured to calculate the duty ratio duty2 to allow the subtraction result ΔI2 to be same as zero. Thus, the duty processing unit 386 is configured to calculate the duty ratio duty2 by performing the feedback control (for example, the PI control or the PID control) based on the converter current I2.

The PWM processing unit 387 is configured to generate a PWM signal Vm2 that is used for controlling the operation of the converter 34 on the basis of the duty ratio duty2 and a predetermined carrier signal. As a result, a switching state(s) of a switching element(s) of the converter 34 changes depending on the PWM signal Vm2. As a result, the converter 34 performs the electrical power conversion to allow the converter current I2 to be the same as the current command signal I2* or the upper limit value Ilim2.

Next, with reference to FIG. 3, a structure of the current command adjusting unit 374 will be explained. As illustrated in FIG. 3, the current command adjusting unit 374 includes a buffer 3741, a signal extracting unit 3742, a waveform shaping unit 3743, a subtracter 3744, an adder 3745 and an upper limit processing unit 3746.

The buffer 3741 is configured to store therein the current command signal I2* that is obtained by the calculation of the current command calculating unit 372 performed during a predetermined period.

The signal extracting unit 3742 is configured to periodically extract the latest current command signal I2* from the buffer 3741 at the second cycle. As described above, the current command signal I2* is periodically transmitted from the microcomputer 37 to the microcomputer 38 at the second cycle. Therefore, the current command signal I2* that is extracted by the signal extracting unit 3742 is the same as the current command signal I2* that is transmitted by the microcomputer 37 (namely, the current command signal I2* that is received by the microcomputer 38). Thus, the operation of the signal extracting unit 3742 is an operation of simulating the communication between the microcomputer 37 and the microcomputer 38 to virtually generate the current command signal I2* that is received by the microcomputer 38.

The waveform shaping unit 3743 is configured to perform the waveform-shape processing that is performed by the above described waveform shaping unit 381 on the current command signal I2* that is obtained by the extraction of the signal extracting unit 3742. As a result, the current command signal I2* that is outputted from the waveform shaping unit 3743 is the same as the current command signal I2* that is outputted from the waveform shaping unit 381. Namely, the current command signal I2* that is outputted from the waveform shaping unit 3743 at a certain timing is the same as the current command signal I2* that is outputted from the waveform shaping unit 381 at the same timing. Therefore, the operation of the buffer 3741, the signal extracting unit 3742 and the waveform shaping unit 3743 is an operation of simulating both of the communication between the microcomputer 37 and the microcomputer 38 and the waveform-shape processing that is performed on the current command signal I2* in the microcomputer 38 to virtually generate (namely, simulate) the current command signal I2* that is actually used to generate the PWM signal Vm2 just now in the microcomputer 38. Namely, the current command signal I2* that is outputted from the waveform shaping unit 3743 at a certain timing is the same as the current command signal I2* that is used to generate the PWM signal Vm2 in the microcomputer 38 at the same timing.

The subtracter 3744 is configured to subtract the current command signal I2* that is outputted from the waveform shaping unit 3743 from the latest current command signal I2* that is obtained by the calculation of the current command calculating unit 372. Here, as described above, the second cycle at which the current command calculating unit 372 transmits the current command signal I2* is longer than the first cycle at which the current command calculating unit 372 calculates the current command signal I2*. Thus, as described later in detail with reference to the Drawings (FIG. 6 and so on), the current command signal I2* that is outputted from the waveform shaping unit 3743 (namely, the current command signal I2* that is actually used by the microcomputer 38) may not be always same as the current command signal I2* that is obtained by the calculation of the current command calculating unit 372. Here, the current command signal I2* that is obtained by the calculation of the current command calculating unit 372 at a desired timing specifies the converter current I2 that should flow through the converter 34 at this desired timing. On the other hand, the current command signal I2* that is outputted from the waveform shaping unit 3743 at the desired timing specifies the converter current I2 that actually flows through the converter 34 at this desired timing. Therefore, when the current command signal I2* that is outputted from the waveform shaping unit 3743 is smaller than the current command signal I2* that is obtained by the calculation of the current command calculating unit 372, it is thought that the shortage of the converter current I2 occurs. On the other hand, when the current command signal I2* that is outputted from the waveform shaping unit 3743 is larger than the current command signal I2* that is obtained by the calculation of the current command calculating unit 372, it is thought that the excess of the converter current I2 occurs. Thus, a subtraction result $\Delta I2^*$ of the subtracter 3744 represents an amount of the shortage of the current command signal I2* (namely, an amount of the shortage of the converter current I2). Namely, when the subtraction result $\Delta I2^*$ is larger than zero (namely, is a positive value), the subtraction result $\Delta I2^*$ represents that the current command signal I2* (namely, the converter current I2) is smaller by an amount of $|\Delta I2^*|$ than the required electrical current I2r. On the other hand, when the subtraction result $\Delta I2^*$ is smaller than zero (i.e. is a negative value), the subtraction result $\Delta I2^*$ represents that the current command signal I2* (namely, the converter current I2) is larger by an amount of $|\Delta I2^*|$ than the required electrical current I2r.

As described above, since the current command signal I2* is transmitted from the microcomputer 37 to the microcomputer 38, there is a possibility that the converter current I2 is not same as the required electrical current I2r (in other words, the converter current I2 has a time lag with respect to the required electrical current I2r). In the present embodiment, at least one of the shortage and the excess of the converter current I2 is canceled by the converter current I1 by adding the shortage amount $\Delta I2^*$ of the converter current I2 to the current command signal I1*. Thus, the adder 3745 is configured to add the shortage amount $\Delta I2^*$ of the converter current I2 to the electrical current I1* that is obtained by the calculation of the current command calculating unit 372. Incidentally, the upper limit processing unit is configure to perform the above described upper limit processing based on the upper limit value Ilim1 on the output of the adder 3745.

(2) Flow of Operation of Electrical Power System 30

Next, with reference to FIG. 4 and FIG. 5, an operation of controlling the converter 33 that is performed by the microcomputer 37 and an operation of controlling the converter 34 that are performed by the microcomputer 38 will be explained, as an operation of the electrical power system 30, in order.

(2-1) Flow of Operation of Controlling Converter 33

Figure 4:
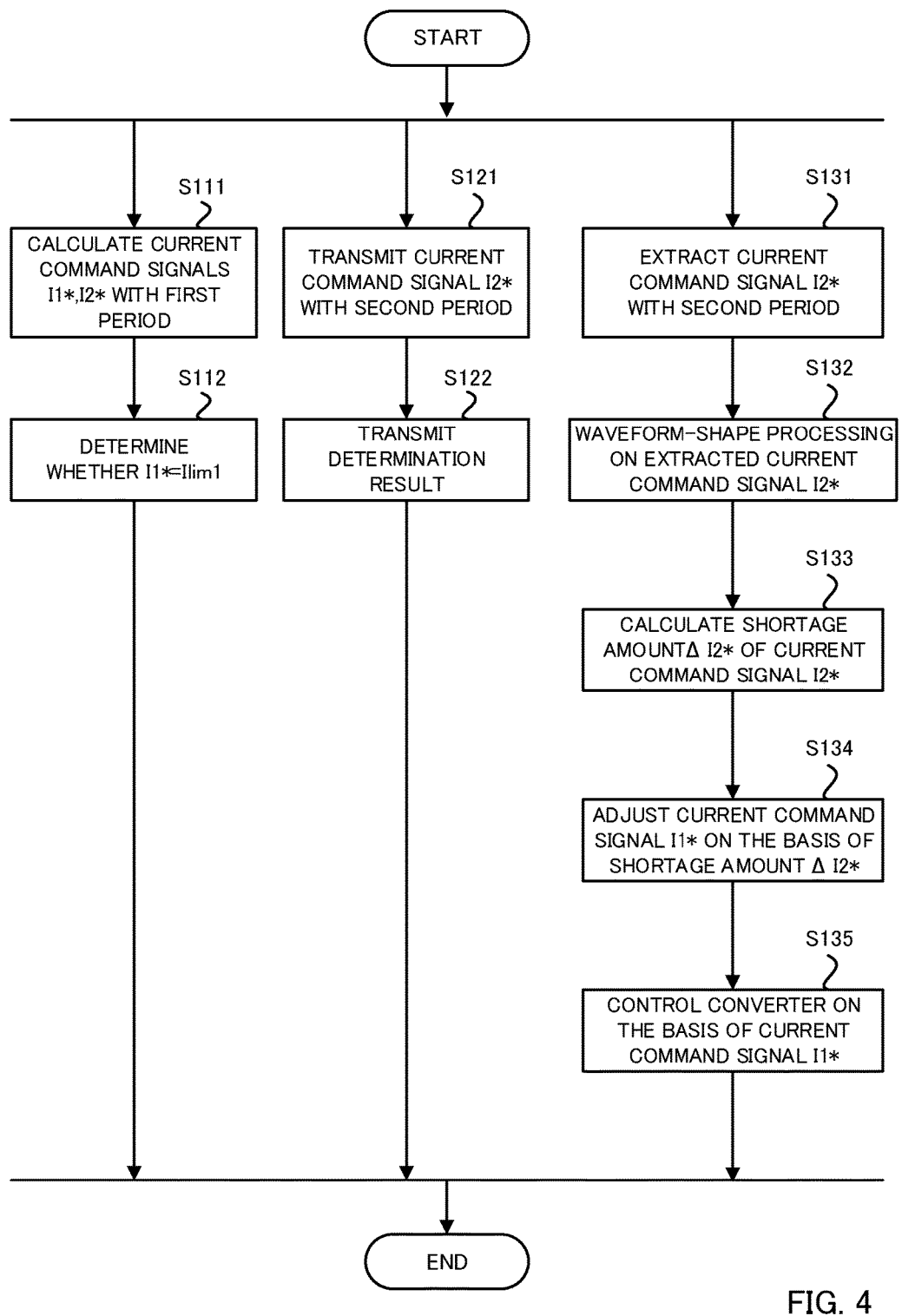
FIG. 4 is a flowchart that illustrates a flow of an operation of the microcomputer.

As illustrated in FIG. 4, the current command calculating unit 372 periodically calculates the current command signal I1* and the current command signal I2* at the first cycle on the basis of the subtraction result $\Delta$VH of the subtracter 371 (step S111). Specifically, the current command calculating unit 372 calculates the current command signal I1* and the current command signal I2* to allow the subtraction result $\Delta$VH to be the same as zero. Thus, the current command calculating unit 372 calculates the current command signal I1* and the current command signal I2* by performing the feedback control (for example, the PI control or the PID control) based on the electrical voltage VH.

The calculated current command signal I1* and the calculated current command signal I2* are outputted to the current command adjusting unit 374. Moreover, the calculated current command signal I2* is stored in the buffer 3741. The buffer 3741 is configured to store the current command signal I2* that has been calculated during a predetermined period from current time point to a past time point that is prior to (before) the current time point by at least the second cycle.

Then, the upper limit determining unit 373 determines whether or not the current command signal I1* that is obtained by the calculation of the current command calculating unit 372 reaches the upper limit value Ilim1 (step S112). Since the current command calculating unit 372 periodically calculates the current command signal I1* at the first cycle, the upper limit determining unit 373 periodically determines at the first cycle whether or not the current command signal I1* that is periodically updated at the first cycle reaches the upper limit value Ilim1.

In parallel with the operation from the step S111 to the step S112, the current command calculating unit 372 periodically transmits the latest current command signal I2* to the microcomputer 38 via the communication line 39 at the second cycle (step S121). Moreover, the upper limit determining unit 373 periodically transmits the determination result of the upper limit determining unit 373 to the microcomputer via the communication line 39 at the second cycle (step S122). The current command calculating unit 372 transmits the current command signal I2* after the current command calculating unit 372 calculates the current command signal I2* once or more times. Similarly, the upper limit determining unit 373 transmits the determination result after the upper limit determining unit 373 performs the determination one or more times.

In parallel with the operation from the step S111 to the step S112 and the operation from the step S121 to the step S122, the signal extracting unit 3742 periodically extracts the latest current command signal I2* from the buffer 3741 at the second cycle (step S131). Namely, the signal extracting unit 3742 virtually generates the current command signal I2* that would be received by the microcomputer 38. The signal extracting unit 3742 extracts the current command signal I2* after the current command calculating unit 372 calculates the current command signal I2* one or more times.

Incidentally, if a time (i.e. a communication time) that is required for the microcomputer 38 completes receiving the current command signal I2* after the microcomputer 37 starts to transmit the current command signal I2* is a considerably large time, the signal extracting unit 3742 may periodically, at the second cycle, extract another current command signal I2* that is obtained prior to obtaining the latest current command signal I2* by the communication time, instead of extracting the latest current command signal.

Then, the waveform shaping unit 3743 performs the waveform-shape processing that is performed by the above described waveform shaping unit 381 on the current command signal I2* that is obtained by the extraction of the signal extracting unit 3742 (step S132). Namely, the waveform shaping unit 3743 virtually generates the current command signal I2* that would be actually used to generate the PWM signal Vm2 just now in the microcomputer 38.

Then, the subtracter 3744 subtracts the current command signal I2* that is outputted from the waveform shaping unit 3743 from the current command signal I2* that is obtained by the calculation of the current command calculating unit 372. Namely, the subtracter 3744 subtracts the current command signal I2* that is outputted from the waveform shaping unit 3743 at the desired timing from the current command signal I2* that is obtained by the calculation of the current command calculating unit 372 at the same desired timing. As a result, the subtracter 3744 outputs the shortage amount ΔI2* of the current command signal I2* (namely, the shortage amount ΔI2* of the converter current I2) (step S133).

Then, the adder 3745 adjusts the current command signal I1* that is obtained by the calculation of the current command calculating unit 372 by using the shortage amount ΔI2* of the converter current I2 (step S134). Specifically, the adder 3745 adds the shortage amount ΔI2* of the converter current I2 to the electrical current signal I1* that is obtained by the calculation of the current command calculating unit 372. The adder 3745 is configured to output the current command signal I1* to which the shortage amount ΔI2* is added to the subtracter 375.

Then, the microcomputer 37 controls the converter 33 on the basis of the current command signal I1* that is obtained by the adjustment at the step S134 (step S135). As a result, the converter 33 performs the electrical power conversion to allow the converter current I1 to be the same as the adjusted current command signal I1*.

As described above, when the shortage amount ΔI2* is larger than zero, the shortage of the converter current I2 occurs. In this case, adding the shortage amount ΔI2* allows the current command signal I1* to increase. As a result, the converter current I1 also increases. Therefore, the shortage of the converter current I2 is canceled by the increase of the converter current I1. On the other hand, as described above, when the shortage amount ΔI2* is smaller than zero, the excess of the converter current I2 occurs. In this case, adding the shortage amount ΔI2* allows the current command signal I1* to decrease. As a result, the converter current I1 also decreases. Therefore, the excess of the converter current I2 is canceled by the decrease of the converter current I1.

(2-2) Flow of Operation of Controlling Converter 34

Figure 5:
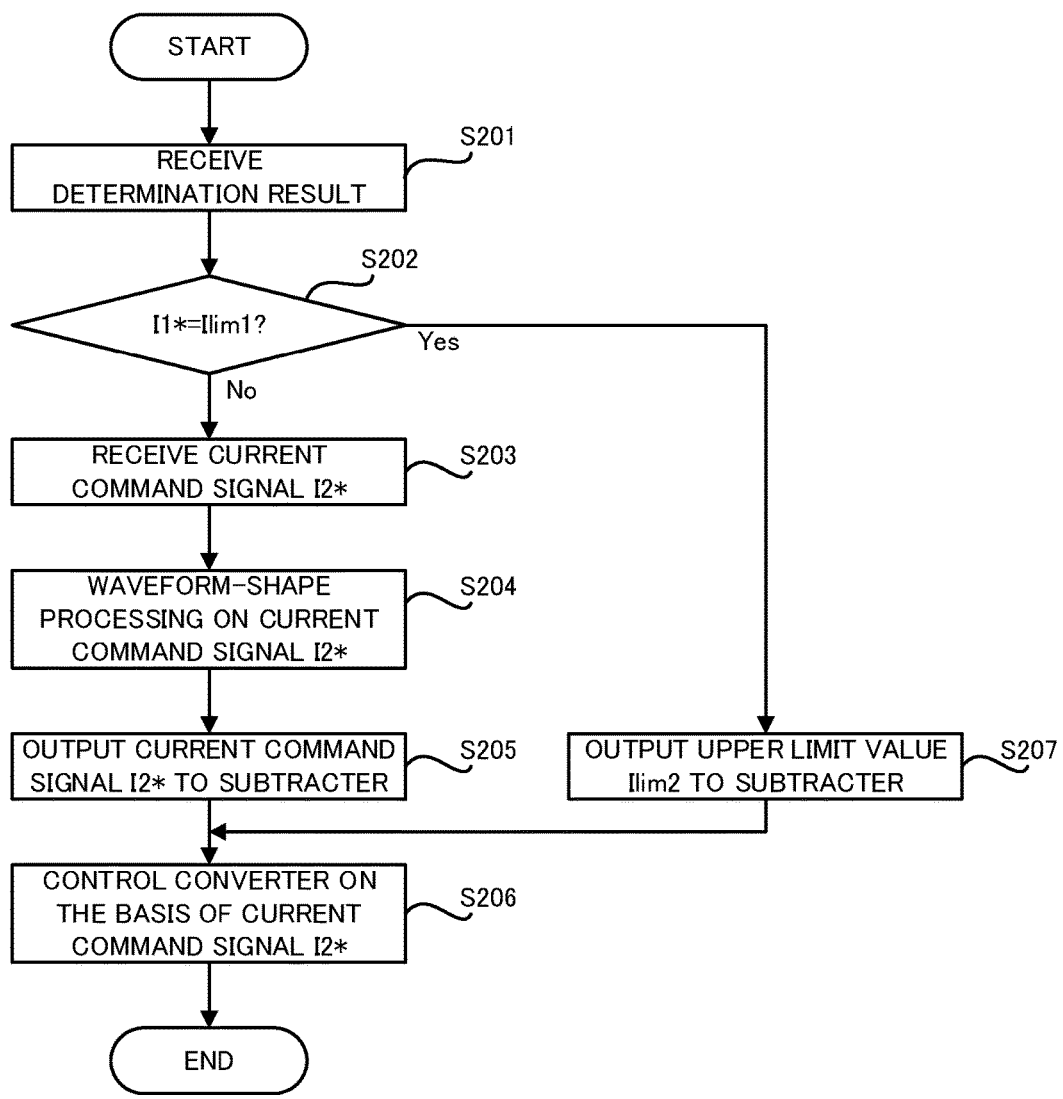
FIG. 5 is a flowchart that illustrates a flow of an operation of the microcomputer.

As illustrated in FIG. 5, the switch controlling unit 383 receives the determination result of the upper limit determination unit 373 (namely, the determination result whether or not the current command signal I1* reaches the upper limit value Ilim1) that is transmitted from the microcomputer 37 via the communication line 39 (step S201). Then, the switch controlling unit 383 determines whether or not the current command signal I1* reaches the upper limit value Ilim1 on the basis of the determination result that is received at the step S201 (step S202)

As a result of the determination at the step S202, when it is determined that the current command signal I1* is smaller than the upper limit value Ilim1 (step S202: No), the switch controlling unit 383 controls the switch 382 to output the current command signal I2*. In order to allow the switch 382 to output the current command signal I2*, the waveform shaping unit 381 receives the current command signal I2* that is transmitted from the microcomputer 37 via the communication line 39 (step S203). Moreover, the waveform shaping unit 381 performs the predetermined waveform-shape processing on the received current command signal I2* (step S204). For example, since the current command signal I2* is calculated at the first cycle and the current command signal I2* is transmitted at the second cycle as described above, the current command signal I2* that is received by the waveform shaping unit 381 may be a signal whose frequency (in other words, resolution) is lower than that of the current command signal I2* that is obtained by the calculation of the current command calculating unit 372. Therefore, the predetermined waveform-shape processing may include a first processing (for example, an up-sampling processing) for converting (restoring) the resolution of the current command signal I2* that is received by the waveform shaping unit 381 to a resolution level corresponding to the resolution of the current command signal I2* that is obtained by the calculation of the current command calculating unit 372. Moreover, the predetermined waveform-shape processing may include a second processing (for example, a processing that is performed by a LPF (Low Pass Filter)) for eliminating noise that is included in the current command signal I2* due to the above described first processing and the transmission.

As a result, the switch 382 outputs, to the subtracter 385, the current command signal I2* that is outputted from the waveform shaping unit 381 (step S205). The microcomputer 38 controls the converter 34 on the basis of the current command signal I2* that is outputted to the subtracter 385 at the step S205 (step S206). As a result, the converter 34 performs the electrical power conversion to allow the converter current I2 to be the same as the current command signal I2* that is obtained by the waveform-shape processing.

On the other hand, as a result of the determination at the step S202, when it is determined that the current command signal I1* reaches the upper limit value Ilim1 (step S202: Yes), the switch controlling unit 383 controls the switch 382 to output the upper limit value Ilim2, instead of the current command signal I2* that is outputted from the waveform shaping unit 381. Namely, when the current command signal I1* reaches the upper limit value Ilim1, the switch 382 outputs the upper limit value Ilim2 to the subtracter 385, whether the current command signal I2* reaches the upper limit value Ilim2 or not (step S207). The microcomputer 38 controls the converter 34 on the basis of the upper limit value Ilim2 that is outputted to the subtracter 385 at the step S207 (step S206). As a result, the converter 34 performs the electrical power conversion to allow the converter current I2 to be the same as the upper limit value Ilim2.

When the switch 382 outputs the upper limit value Ilim2, the waveform shaping unit 381 may not receive the current command signal I2* that is transmitted from the microcomputer 37 via the communication line 39. The waveform shaping unit 381 may not perform the waveform-shape processing on the current command signal I2*

(2-3) Explanation of Technical Effect

Next, a technical effect of the electrical power system 30 will be explained. In the following explanation, a technical effect that is achieved when the current command signal I1* is smaller than the upper limit value Ilim1 will be firstly explained. Specifically, a technical problem that occurs when the current command signal I1* is not adjusted is firstly explained with reference to FIG. 6, and then a technical effect that is achieved by adjusting the current command signal I1* will be explained with reference to FIG. 7. Then, a technical effect that is achieved when the current command signal I1* reaches the upper limit value Ilim1 will be explained. Specifically, a technical problem that occurs when the current command signal I1* reaches the upper limit value Ilim1 will be firstly explained with reference to FIG. 8, and then a technical effect that is achieved by the output of the upper limit value Ilim2 from the switch 382 when the current command signal I1* reaches the upper limit value Ilim1 will be explained with reference to FIG. 9.

Incidentally, in the following explanation, an example in which the first cycle is 0.5 ms (mili-second) and the second cycle is 2.5 ms will be explained, for the purpose of the simple explanation. However, the first cycle may be any cycle that is different from 0.5 ms and the second cycle may be any cycle that is different from 2.5 ms.

(2-3-1) Technical Effect when Current Command Signal I1* is Smaller than Upper Limit Value Ilim1

Figure 6:
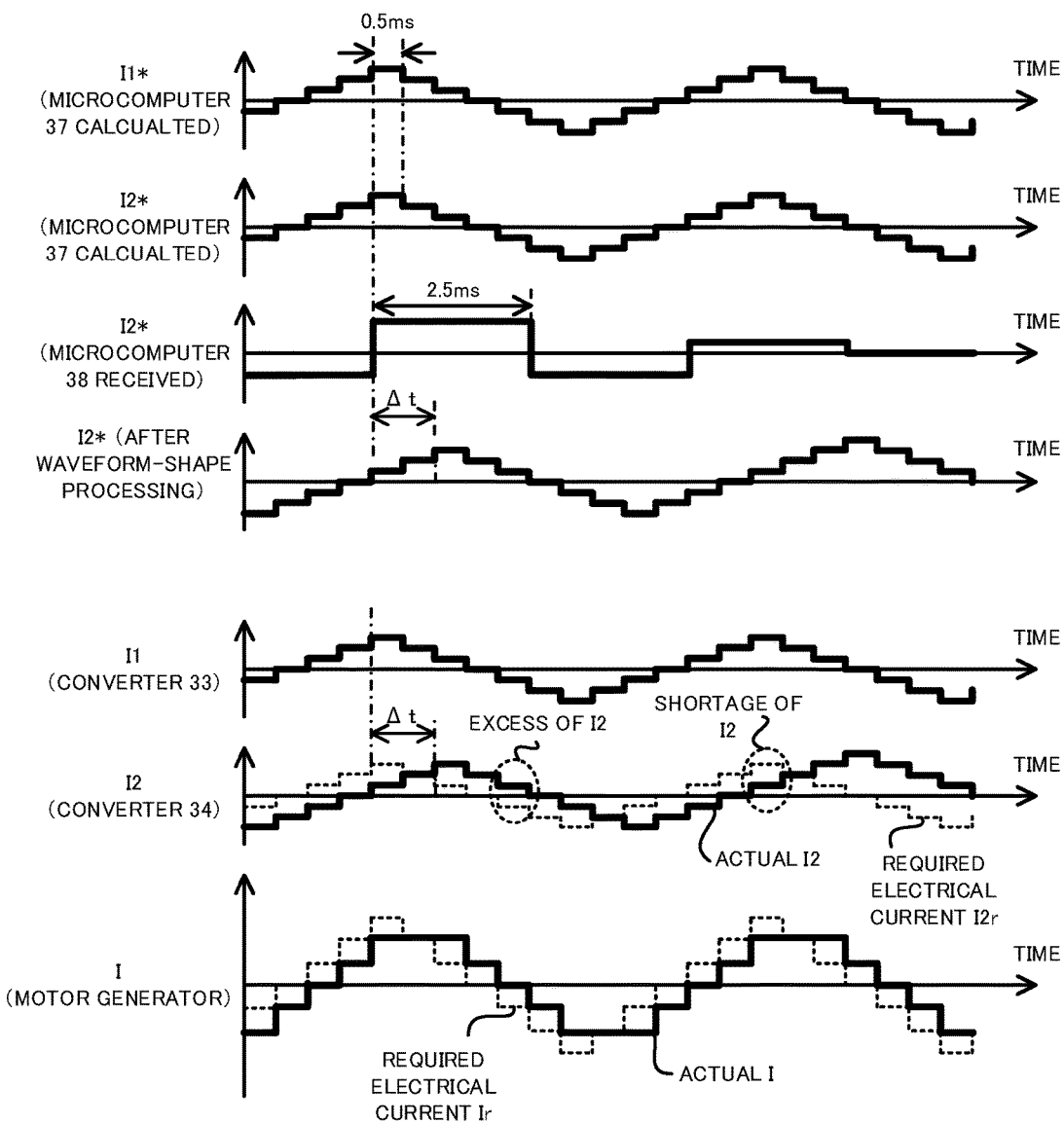
FIG. 6 is a timing chart that illustrates one specific example of a current command signal and a converter current.

As illustrated in a first top graph and a second top graph in FIG. 6, the current command calculating unit 372 periodically generates the current command signal I1* and the current command signal I2* at the cycle of 0.5 ms. Thus, each of the current command signal I1* and the current command signal I2* is a digital signal whose value may change every 0.5 ms.

The current command calculating unit 372 periodically transmits the current command signal I2* to the microcomputer 38 at the cycle of 2.5 ms. Thus, as illustrated in a third top graph in FIG. 6, the microcomputer 38 (specifically, the waveform shaping unit 381) receives the current command signal I2* that is a digital signal whose value may change every 2.5 ms. Incidentally, FIG. 6 illustrates an example in which the time (i.e. the communication time) that is required for the microcomputer 38 to complete receiving the current command signal I2* after the microcomputer 37 starts to transmit the current command signal I2* is negligibly small (for example, is substantially the same as zero), for the purpose of the simple explanation. However, the third top graph (in addition, a fourth top graph) may move toward the right side in FIG. 6 by an amount corresponding to the communication time.

The waveform shaping unit 381 performs the waveform-shape processing on the current command signal I2* whose value may change every 2.5 ms and that is received by the waveform shaping unit 381. As a result, the waveform shaping unit 381 generates the current command signal I2* whose value may change every 0.5 ms and that would be obtained by the calculation of the current command calculating unit 372, as illustrated in the fourth top graph in FIG. 6. However, as illustrated in the second top graph and the fourth top graph in FIG. 6, there is a possibility that the current command signal I2* that is obtained by the waveform-shape processing (namely, the current command signal I2* that is actually used by the microcomputer 38) is different the current command signal I2* that is obtained by the calculation of the current command calculating unit 372 (namely, the current command signal I2* that should be used by the microcomputer 38) due to an accuracy level of the waveform-shape processing and the difference between the calculation cycle of the current command signal I2* and a transmission cycle of the current command signal I2*. Typically, there is a time difference Δt between the current command signal I2* that is obtained by the waveform-shape processing and the current command signal I2* that is obtained by the calculation of the current command calculating unit 372.

When there is the time difference Δt in the current command signal I2*, as illustrated in a sixth top graph in FIG. 6, there is also the time difference Δt between the actual converter current I2 (it is illustrated by a solid line) and the required electrical current I2r (it is illustrated by a dashed line). Thus, the converter current I2 may be smaller than the required electrical current I2r (in other words, the shortage of the converter current I2 occurs) at one timing. Moreover, the converter current I2 may be larger than the required electrical current I2r (in other words, the excess of the converter current I2 occurs) at another timing.

If the current command signal I1* is not adjusted when there is the time difference Δt between the converter current I2 and the required electrical current I2r, the converter current I1 is the same as a required electrical current I1r corresponding to the converter current I1 that should be inputted to the converter 33 or that should be outputted from the converter 33. Thus, since at least one of the shortage and the excess of the converter current I2 occurs while the converter current I1 is the same as the required electrical current I1r, there is an imbalance between the converter current I1 and the converter current I2. This imbalance may cause an undesired flowing of the electrical current from the converter 33 to the converter 34 and an undesired flowing of the electrical current from the converter 34 to the converter 33. Moreover, as illustrated in a seventh top graph in FIG. 6, there is a possibility that an actual motor current I that is a sum of the actual converter current I1 and the actual converter current I2 (namely, an electrical current that is actually inputted to the motor generator 10 or that is actually outputted from the motor generator 10) is also different from a required electrical current Ir corresponding to the motor current I that should be inputted to the motor generator 10 or that should be outputted from the motor generator 10. Thus, there is a possibility that the output of the motor generator 10 is unstable. Moreover, since at least one of the shortage and the excess of the converter current I2 occur while the converter current I1 is the same as the required electrical current I1r, there is a possibility that at least one of an undesired increase and an undesired decrease of the electrical voltage VH occurs. Incidentally, increasing a capacity of the smoothing condenser 35 may result in a suppression of the undesired increase and decrease of the electrical voltage VH. However, increasing the capacity of the smoothing condenser 35 also results in an increase of a cost and a size of the smoothing condenser 35, and thus it is not necessarily the best method.

Figure 7:
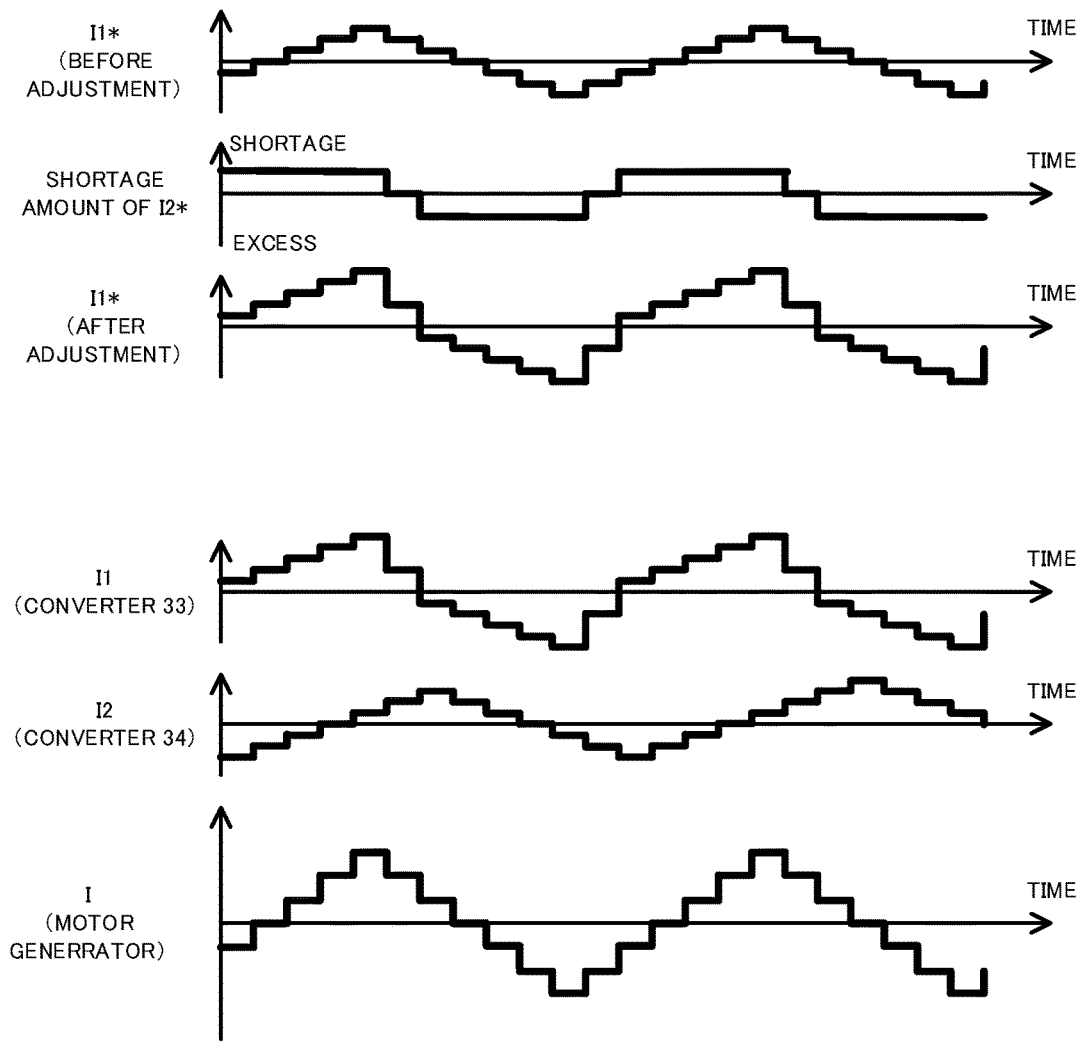
FIG. 7 is a timing chart that illustrates one specific example of the current command signal and the converter current.

Thus, in the present embodiment, the current command signal I1* is adjusted to allow the converter current I1 to cancel at least one of the shortage and the excess of the converter current I2, as described above. Specifically, the shortage amount ΔI2* (see a second top graph in FIG. 7) of the converter current I2 is added to the current command signal I1* (see a first top graph in FIG. 7). As a result, the adjusted current command signal I1* is generated (see a third top graph in FIG. 7). Thus, as illustrated in a fourth top graph in FIG. 7, the converter current I1 is not same as the required electrical current I1r and is an electrical current depending on the adjusted current command signal I1*. As a result, the actual motor current I (see a sixth top graph in FIG. 7) that is the sum of the converter current I1 illustrated in a fourth top graph in FIG. 7 and the converter current I2 illustrated in a fifth top graph in FIG. 7 is the same as the required electrical current Ir. Moreover, the above described imbalance that is caused by the occurrence of at least one of the shortage and the excess of the converter current while the converter current I1 is the same as the required electrical current I1r does not occur, and thus it is possible to suppress the undesired flowing of the electrical current from the converter 33 to the converter 34 and the undesired flowing of the electrical current from the converter 34 to the converter 33. Moreover, it is possible to suppress at least one of the undesired increase and the undesired decrease of the electrical voltage VH, and thus the capacity of the smoothing condenser 35 can be reduced (alternatively, can be relatively small).

(2-3-2) Technical Effect when Current Command Signal I1* Reaches Upper Limit Value Ilim1

On the other hand, since at least one of the shortage and the excess of the converter current I2 is canceled by the converter current I1 as described above, the current command signal I1 needs to be adjusted to cancel at least one of the shortage and the excess of the converter current I2. However, as illustrated in a first top graph in FIG. 8, when the current command signal I1* that is obtained by the calculation of the current command calculating unit 372 reaches the upper limit value Ilim1, the current command signal I1* is fixed to the upper limit value Ilim1. Namely, the current command signal I1* cannot be adjusted any more. Thus, as illustrated in a second top graph in FIG. 8, the converter current I1 is also fixed to its upper limit and thus it is not possible to increase the converter current I1 any more.

Therefore, when the shortage of the converter current I2 occurs while the current command signal I1* reaches the upper limit value Ilim1, the shortage of the converter current I2 cannot be canceled by the increase of the converter current I1. When the required electrical current Ir increases relatively rapidly, the shortage of the converter current I2 likely occurs while the current command signal I1* reaches the upper limit value Ilim1. Specifically, for example, when the vehicle 1 slips or the like, the rotation number of the motor generator 10 increases rapidly and thus the required electrical current Ir increases rapidly. When the required electrical current Ir increases rapidly, the required electrical current I1r and the required current I2r also increase rapidly in order to allow the motor current I to be same as the required electrical current Ir. When the required electrical current I1r and the required current I2r increase rapidly, the current command signal I1* and the current command signal I2* also increase rapidly. When the current command signal I1* and the current command signal I2* increase rapidly, the current command signal I1* reaches the upper limit value Ilim1 relatively easily and the current command signal I2* reaches the upper limit value Ilim2 relatively easily. However, since there is the time difference Δt in the current command signal I2* as described above, there is a possibility that the current command signal I2* that is actually used by the microcomputer 38 is smaller than the upper limit value Ilim2 while the current command signal I1* reaches the upper limit value Ilim1. As a result, there is a possibility that the shortage of the converter current I2 occurs while the current command signal I1* reaches the upper limit value Ilim1.

Figure 8:
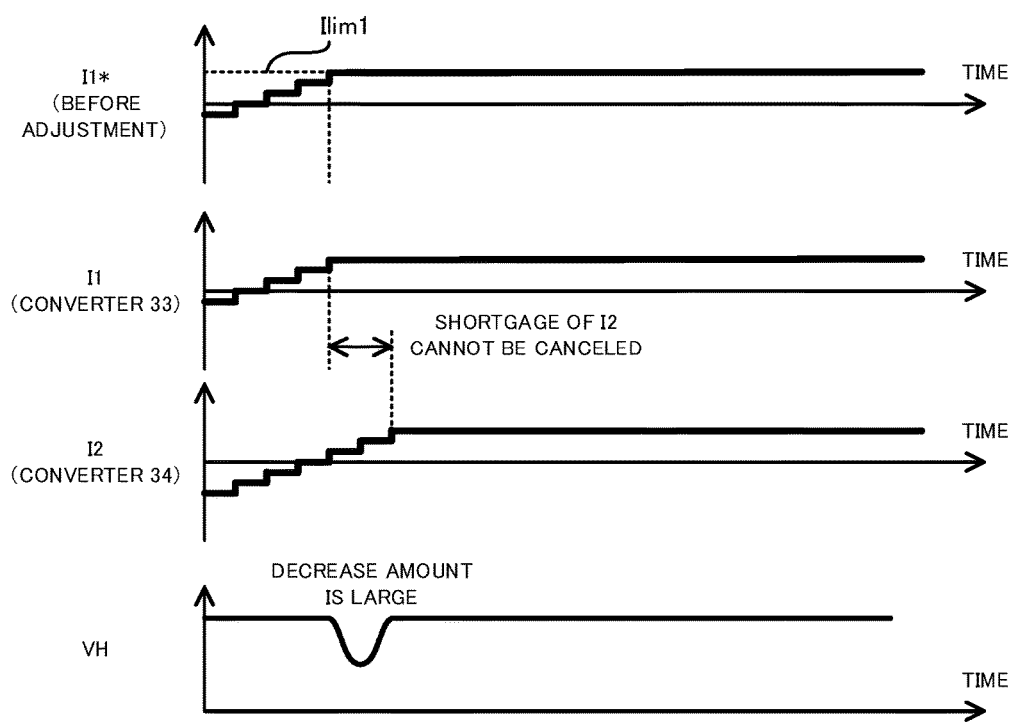
FIG. 8 is a timing chart that illustrates one specific example of the current command signal and the converter current.

When the shortage of the converter current I2 occurs while the current command signal I1* reaches the upper limit value Ilim1, as illustrated in a third top graph in FIG. 8, the converter current I2 increases later than the converter current I1. Thus, a period over which the shortage of the motor current I occurs becomes relatively longer, compared to the case where the shortage of the converter current I2 can be canceled by the increase of the converter current I1. Moreover, as illustrated in a fourth top graph in FIG. 8, a decrease amount of the electrical voltage VH also becomes relatively larger because the period over which the shortage of the converter current I2 occurs becomes relatively longer.

Figure 9:
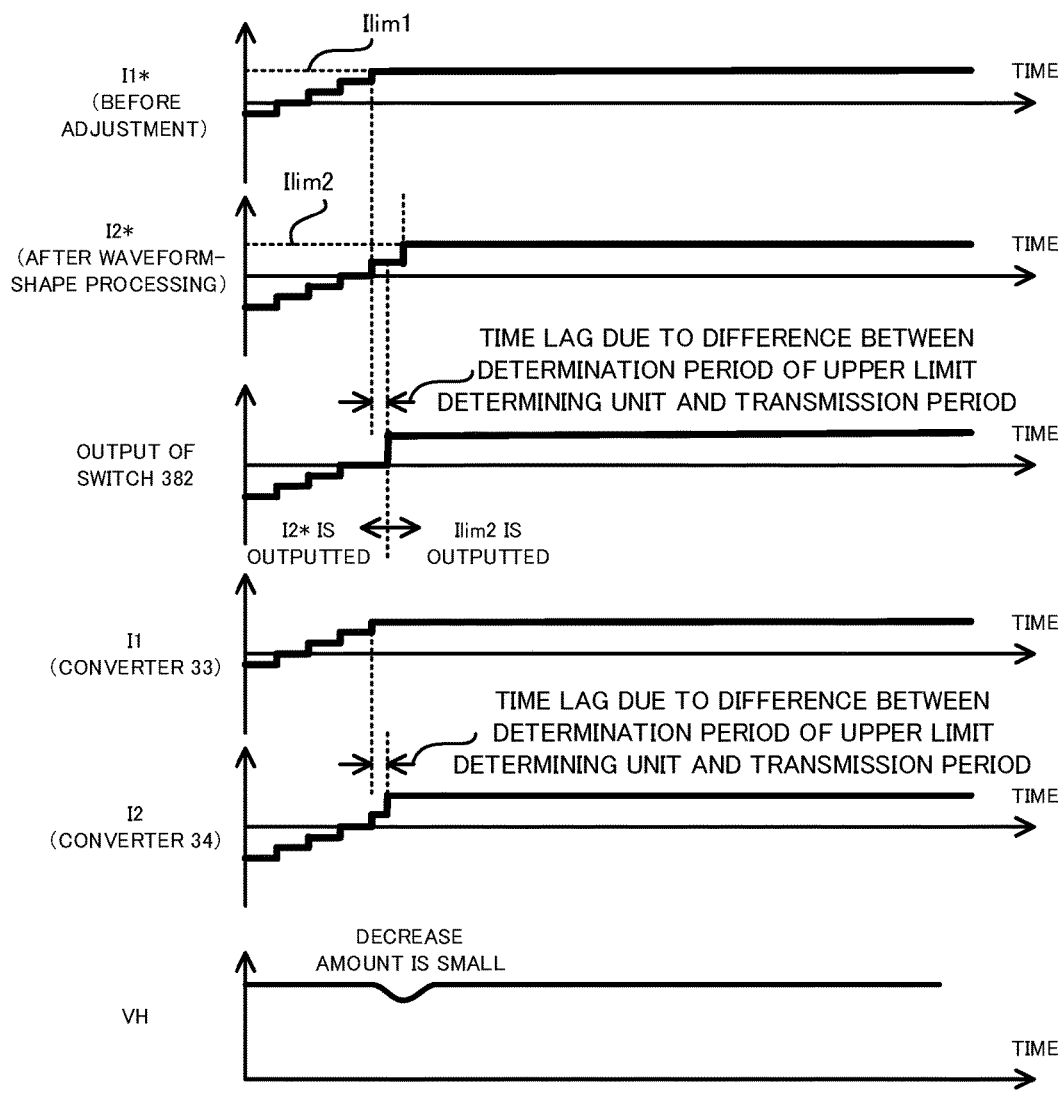
FIG. 9 is a timing chart that illustrates one specific example of the current command signal and the converter current.

Thus, in the present embodiment, as described above, when the current command signal I1* that is obtained by the calculation of the current command calculating unit 372 reaches the upper limit value Ilim1, the switch 382 outputs the upper limit Ilim2 to the subtracter 385 even when the current command signal I2* that is outputted from the waveform shaping unit 381 is smaller than the upper limit value Ilim2, as illustrated in a first top graph to a third top graph in FIG. 9. Thus, as illustrated in a fourth top graph to a fifth top graph in FIG. 9, the converter current I2 increases earlier, compared to the case where the current command signal I2* that is outputted from the waveform shaping unit 381 is kept to be outputted to the subtracter 385. Therefore, it is possible to suppress the increase of the period over which the shortage of the motor current I occurs. Moreover, as illustrated in the fifth top graph in FIG. 9, the decrease amount of the electrical voltage VH can be reduced, because the period over which the shortage of the motor current I occurs can be reduced.

Incidentally, as described above, the switch 382 is configured to output the upper limit Ilim2 on the basis of the determination result of the upper limit determining unit 373. The determination result of the upper limit determining unit 373 is periodically transmitted from the microcomputer 37 to the microcomputer 38 at the second cycle (for example, the cycle of 2.5 ms). On the other hand, the upper limit determining unit 373 is configured to periodically determine at the first cycle (for example, the cycle of 0.5 ms) whether or not the current command signal I1* reaches the upper limit value Ilim1. Therefore, as illustrated in the fifth top graph in FIG. 9, the converter current I2 still increases later than the converter current I1 due to the difference between the transmission cycle and a determination cycle of the upper limit determining unit 373. However, when the upper limit value Ilim2 is outputted to the subtracter 385, the waveform shaping unit 381 may not perform the waveform-shape processing. Therefore, a time that is required to output the upper limit value Ilim2 to the subtracter 385 is smaller, by at least an amount corresponding to a time that is required for the waveform shaping unit 381 to perform the waveform-shape processing, than a time that is required to output the current command signal I2* from the waveform shaping unit 381 to the subtracter 385. Thus, it is possible to suppress the increase of the period over which the shortage of the motor current I occurs by at least the amount corresponding to the time that is required for the waveform shaping unit 381 to perform the waveform-shape processing.

Incidentally, the microcomputer 38 (for example, the switch controlling unit 383 of the microcomputer 38) may include the upper limit determining unit 373. In this case, the current command calculating unit 372 may periodically transmit the current command signal I1* to the microcomputer 38 at the second cycle. Moreover, the microcomputer 37 may not include the upper limit determining unit 373.

At least one portion of the structure of the vehicle 1 (for example, at least one portion of the structure of at least one of the microcomputer 37 and the microcomputer 38) in the present embodiment can be eliminated or modified accordingly. At least one portion of the operation that is performed by at least one of the microcomputer 37 and the microcomputer 38 in the present embodiment can be eliminated or modified accordingly. The order of the processes in the operation that is performed by at least one of the microcomputer 37 and the microcomputer 38 can be changed accordingly.

This application is based upon and claims the benefit of priority of the prior Japanese Patent Application No. 2015-251034, filed on Dec. 24, 2015, the entire contents of which are incorporated herein by reference. In addition, the entire contents of the above described Japanese Unexamined Patent Application Publication No. 2010-098823A is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention. An electrical power system, which involves such changes, are also intended to be within the technical scope of the present invention.

What is claimed is:

1. An electrical power system comprising:
    a first electrical power converter that is configured to perform a first electrical power conversion between an electrical power storage apparatus and a load;
    a second electrical power converter that is configured to perform a second electrical power conversion between the electrical power storage apparatus and the load;
    a first controller that is configured to periodically generate a first command signal and a second command signal at a first cycle, to control the first electrical power converter such that a first electrical current based on the first command signal flows through by the first electrical power conversion, and to periodically transmit the second command signal to a second controller via a communication line at a second cycle that is longer than the first cycle; and
    the second controller is configured to receive the second command signal transmitted by the first controller, to perform a predetermined signal processing on the received second command signal, and to control the second electrical power converter such that a second electrical current, based on the second command signal on which the signal processing is performed, flows through by the second electrical power conversion,
    the first controller being configured to adjust the generated first command signal to allow at least one of shortage and excess of the second electrical current that actually flows by the second electrical power conversion to be canceled by the first electrical current, after generating the first command signal and the second command signal,
    at least one of the first controller and the second controller being configured to determine whether or not the generated first command signal reaches a first upper limit value that specifies an upper limit of the first command signal,
    the second controller being configured to control the second electrical power converter such that the second electrical current, based on the second command signal on which the signal processing is performed, flows through, when it is determined that the generated first command signal is smaller than the first upper limit value,
    the second controller being configured to control the second electrical power converter such that the second electrical current, based on a second upper limit value that specifies an upper limit of the second command signal, flows through, when it is determined that the generated first command signal reaches the first upper limit value.

2. The electrical power system according to claim 1, wherein
    the second controller is configured to control the second electrical power converter such that the second electrical current based on the second upper limit value flows through, if it is determined that the generated first command signal reaches the first upper limit value, including if the second command signal on which the signal processing is performed is smaller than the second upper limit value.

3. The electrical power system according to claim 1, wherein
    the first controller is configured to adjust the first command signal by simulating the second command signal that is used at a first timing by the second controller to control the second electrical power converter and then adding the first command signal that is generated at the first timing and an adjustment signal that corresponds to a difference between the simulated second command signal and the second command signal that is generated at the first timing.

4. The electrical power system according to claim 3, wherein
    the first controller includes a buffer that is configured to buffer the generated second command signal,
    the first controller is configured to simulate the second command signal by periodically extracting the latest second command signal from the buffer at the second cycle and then performing the predetermined signal processing on the extracted second command signal.

5. The electrical power system according to claim 1, wherein
    the electrical power system is mounted on a vehicle,
    the load includes a rotating electrical machine that is a driving power source for the vehicle.

* * * * *